United States Patent
Wu

(10) Patent No.: US 10,863,398 B2
(45) Date of Patent: Dec. 8, 2020

(54) DEVICE AND METHOD OF HANDLING A HANDOVER

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 55 days.

(21) Appl. No.: 16/040,520

(22) Filed: Jul. 19, 2018

(65) Prior Publication Data

US 2019/0028940 A1 Jan. 24, 2019

Related U.S. Application Data

(60) Provisional application No. 62/535,253, filed on Jul. 21, 2017.

(51) Int. Cl.
| | |
|---|---|
| *H04W 36/00* | (2009.01) |
| *H04W 36/38* | (2009.01) |
| *H04W 8/22* | (2009.01) |
| *H04W 8/24* | (2009.01) |
| *H04W 36/08* | (2009.01) |

(52) U.S. Cl.
CPC ... *H04W 36/0072* (2013.01); *H04W 36/0005* (2013.01); *H04W 36/38* (2013.01); *H04W 8/22* (2013.01); *H04W 8/24* (2013.01); *H04W 36/08* (2013.01)

(58) Field of Classification Search
None
See application file for complete search history.

(56) References Cited

U.S. PATENT DOCUMENTS

| | | | |
|---|---|---|---|
| 2013/0028236 | A1 | 1/2013 | Jung |
| 2013/0215772 | A1 | 8/2013 | Kaur |
| 2015/0249941 | A1 | 9/2015 | Wang |
| 2016/0302177 | A1 | 10/2016 | Kwon |

(Continued)

FOREIGN PATENT DOCUMENTS

CN 103209403 A 7/2013

(Continued)

OTHER PUBLICATIONS

Samsung, RAN2 impacts from bandwidth part in NR, 3GPP TSG-RAN WG2 NR #98 Meeting, R2-1704503, Hangzhou, China, May 15th-19th, 2017.

(Continued)

*Primary Examiner* — Diane L Lo
(74) *Attorney, Agent, or Firm* — Winston Hsu

(57) ABSTRACT

A network comprising a first BS for handling a handover comprises at least one storage device for storing instructions and at least one processing circuit coupled to the at least one storage device. The at least one processing circuit is configured to execute the instructions stored in the at least one storage device. The instructions comprise the first BS receiving a Handover Request message from a second BS, wherein the Handover Request message comprises a first plurality of UE capabilities, and the first plurality of UE capabilities indicate a first maximum reception (RX) bandwidth (BW) (RX_BW) for a frequency band; the first BS obtaining a first RX_BW and a first location of the first RX_BW at a first carrier; the first BS generating a handover command configuring the first communication device; and the first BS transmitting a Handover Request Acknowledge message comprising the handover command, to the second BS.

13 Claims, 5 Drawing Sheets

(56) References Cited

U.S. PATENT DOCUMENTS

2017/0188269 A1    6/2017  Sunel

OTHER PUBLICATIONS

Office action dated Mar. 12, 2019 for the Taiwan application No. 107125023, filing date Jul. 19, 2018, p. 1-17.
Search Report dated Oct. 2, 2018 for EP application No. 18184736.9, pp. 1-10.
Nokia, Alcatel-Lucent Shanghai Bell, "Discussion UE bandwidth capability", 3GPP TSG-RAN WG4 #83 Meeting, R4-1706852, May 15-19, 2017, Hangzhou,China, XP051302890, pp. 1-4.
3GPP TS 36.300 V14.3.0 (Jun. 2017), "3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 14)", XP051299009, pp. 1-331.
3GPP TS 36.331 V14.3.0 (Jun. 2017), "3rd Generation Partnership Project;Technical Specification Group Radio Access Network;Evolved Universal Terrestrial Radio Access (E-UTRA);Radio Resource Control (RRC);Protocol specification(Release 14)", XP051336663, pp. 1-745.
3GPP TS 36.423 V14.3.0 (Jun. 2017), 3rd Generation Partnership Project;Technical Specification Group Radio Access Network;Evolved Universal Terrestrial Radio Access Network(E-UTRAN);X2 application protocol (X2AP) (Release 14), XP051299045, pp. 1-242.
Office action dated Jul. 2, 2020 for the China application No. 201810806172.6, filed Jul. 20, 2018, pp. 1-7.

DEVICE AND METHOD OF HANDLING A HANDOVER

CROSS REFERENCE TO RELATED APPLICATIONS

This application claims the benefit of U.S. Provisional Applications No. 62/535,253 filed on Jul. 21, 2017, which is incorporated herein by reference.

BACKGROUND OF THE INVENTION

1. Field of the Invention

The present invention relates to a device and a method used in a wireless communication system, and more particularly, to a device and a method of handling a handover in a wireless communication system.

2. Description of the Prior Art

When a handover is initiated for a communication device from a first base station (BS) to a second BS, the second BS does not know a maximum bandwidth that the communication device is capable of performing a reception. If a bandwidth transmitted by the first BS is larger than the maximum bandwidth, the communication device may fail to perform the reception in the bandwidth. Thus, how to handle the handover and the reporting is a problem to be solved.

SUMMARY OF THE INVENTION

The present invention therefore provides a communication device for handling a handover to solve the abovementioned problem.

A network comprising a first BS for handling a handover comprises at least one storage device for storing instructions and at least one processing circuit coupled to the at least one storage device. The at least one processing circuit is configured to execute the instructions stored in the at least one storage device. The instructions comprise the first BS receiving a Handover Request message from a second BS, to initiate a handover for the first communication device, wherein the Handover Request message comprises a first plurality of UE capabilities, and the first plurality of UE capabilities indicate a first maximum reception (RX) bandwidth (BW) (RX_BW) for a frequency band; the first BS obtaining a first RX_BW and a first location of the first RX_BW at a first carrier according to the first maximum RX_BW; the first BS generating a handover command configuring the first communication device to hand over to a first cell, wherein the handover command comprises a first cell identity of the first cell, a first absolute radio-frequency channel number (ARFCN), the first RX_BW and the first location of the first RX_BW; and the first BS transmitting a Handover Request Acknowledge message comprising the handover command, to the second BS, in response to the first Handover Request message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
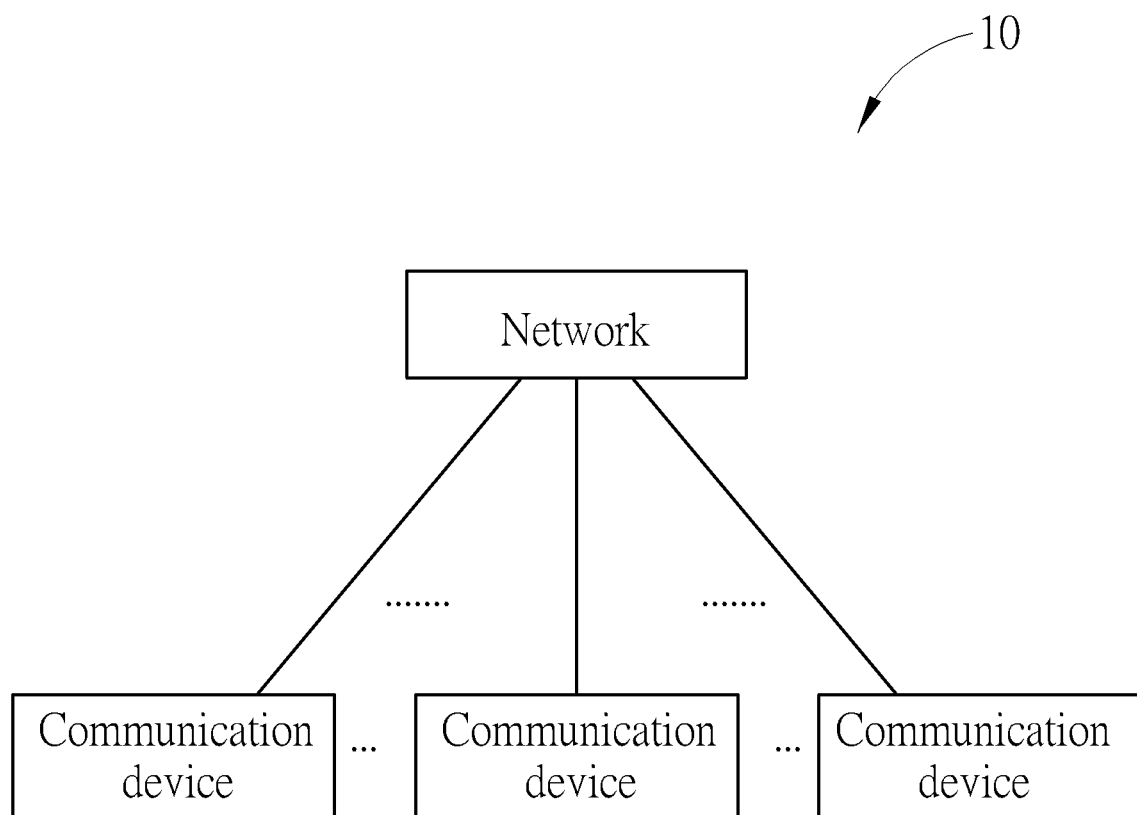
FIG. 1 is a schematic diagram of a wireless communication system according to an example of the present invention.

In FIG. 1, a network and communication devices are simply utilized for illustrating the structure of a wireless communication system 10. Practically, the network includes at least one of a long-term evolution (LTE) network, an evolved LTE network, a new radio (NR) network and a sixth generation (6G) network. The 6G radio communication technology may employ orthogonal frequency-division multiplexing (OFDM) or non-OFDM, a wider bandwidth (e.g., 1 GHz, 2 GHz or 5 GHz) and a transmission time interval (TTI) shorter than 1 ms (e.g., 1, 2, 3 or 4 OFDM symbols, 100, or 200 us) for communicating between the communication devices and the 6G BS.

A communication device may be a user equipment (UE), a mobile phone, a laptop, a tablet computer, an electronic book, a portable computer system, a vehicle, or an aircraft. In addition, the network and the communication device can be seen as a transmitter or a receiver according to direction of transmission (i.e., transmission direction), e.g., for an uplink (UL), the communication device is the transmitter and the network is the receiver, and for a downlink (DL), the network is the transmitter and the communication device is the receiver.

Figure 2:
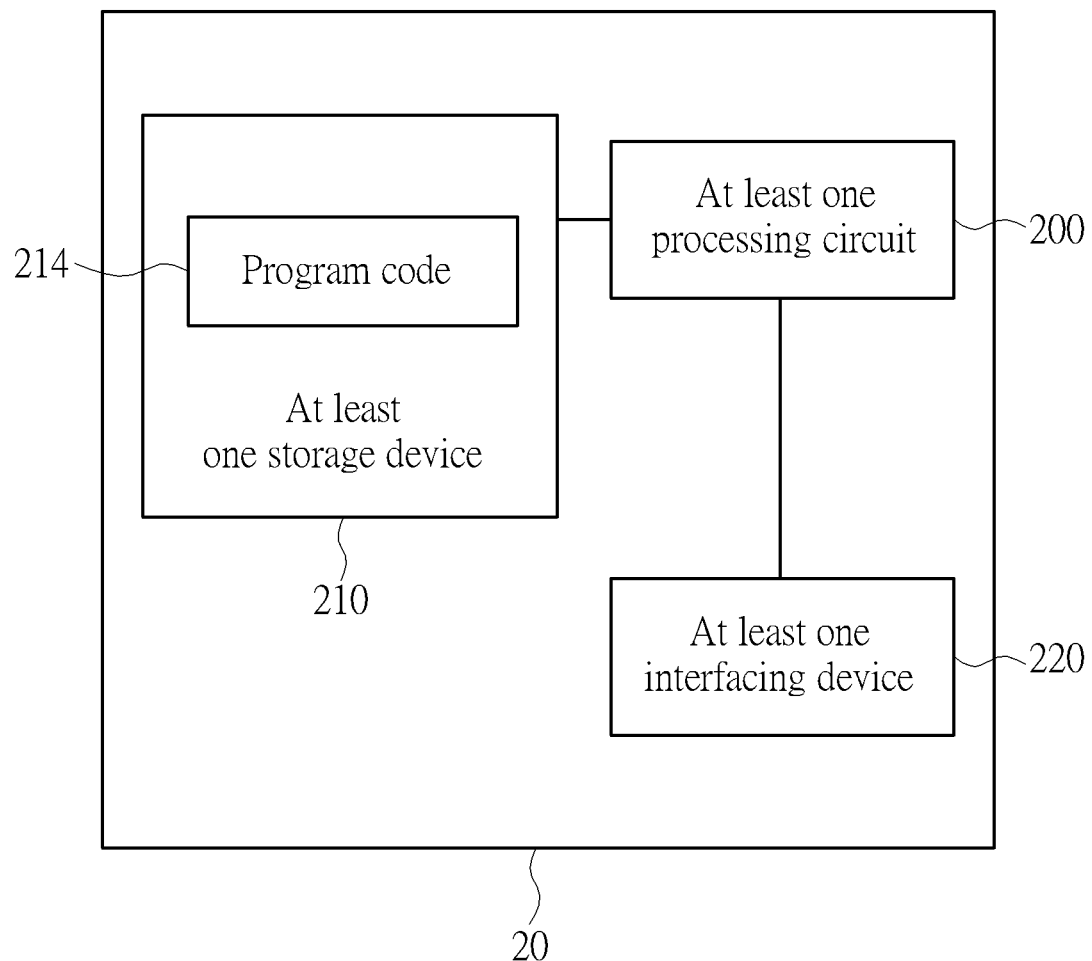
FIG. 2 is a schematic diagram of a communication device according to an example of the present invention.

In FIG. 2, a communication device 20 may be a communication device or the network shown in FIG. 1, but is not limited herein. The communication device 20 may include at least one processing circuit 200 of which each may be a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver used to transmit and receive signals (e.g., data, messages and/or packets) according to processing results of the at least one processing circuit 200.

Figure 3:
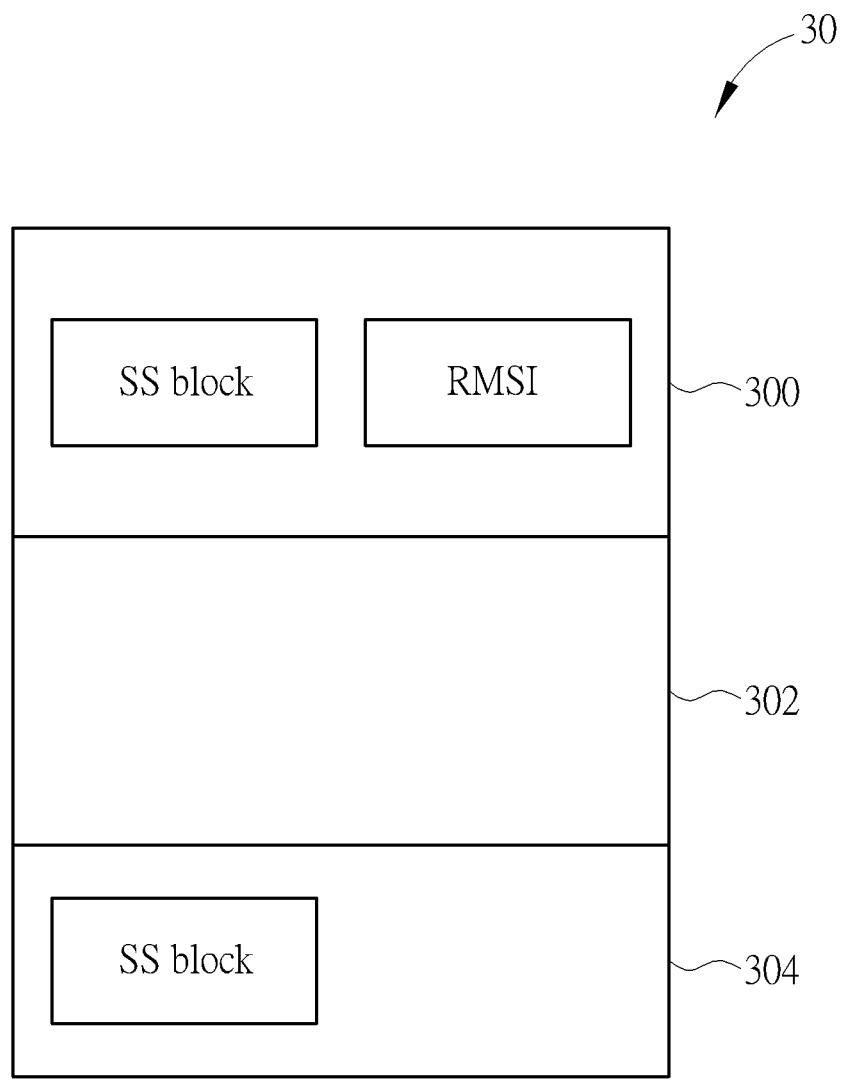
FIG. 3 is a schematic diagram of bandwidth parts (BWPs) in a system bandwidth according to an example of the present invention.

FIG. 3 is an example of bandwidth parts (BWPs) in a system bandwidth 30 according to an example of the present invention. There are three types of BWPs belonging to a carrier (e.g., a component carrier) used for a communication between a UE and a cell of a BS. The BWP 300 with a synchronization signal (SS) block (SSB) and a remaining system information (RMSI) is the first type of BWP. The BWP 302 without the SSB and the RMSI is the second type of BWP. The BWP 304 with the SSB but without the RMSI is the third type of BWP. The SSB may comprise a primary SS (PSS), a secondary SS (SSS) and a physical broadcast channel (PBCH). A DL carrier may have at least one BWP of which each is one of the three types. A UL carrier may have at least one BWP of which each is the second type of BWP.

In the following examples, a UE is used for representing a communication device in FIG. 1, to simplify the illustration of the examples.

Figure 4:
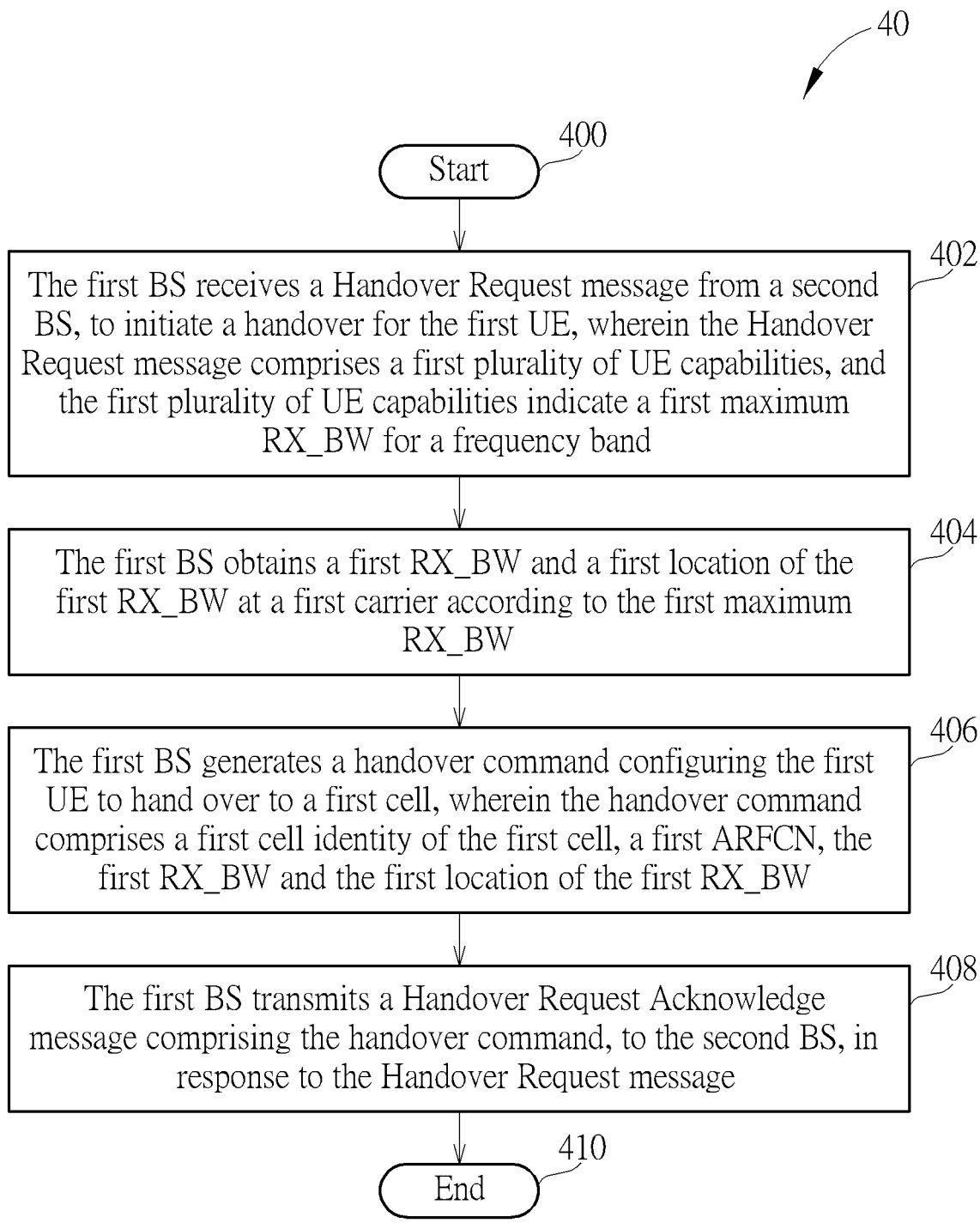
FIG. 4 is a flowchart of a process according to an example of the present invention.

A process 40 in FIG. 4 is utilized in a network including a first BS to handle a handover, and includes the following steps:

Step 400: Start.

Step 402: The first BS receives a Handover Request message from a second BS, to initiate a handover for the UE, wherein the Handover Request message comprises a plurality of UE capabilities, and the plurality of UE capabilities indicate a first maximum reception (RX) bandwidth (BW) (RX_BW) for a frequency band.

Step 404: The first BS obtains a first RX_BW and a first location of the first RX_BW at a carrier according to the first maximum RX_BW.

Step 406: The first BS generates a handover command configuring the first UE to hand over to a first cell, wherein the handover command comprises a first cell identity of the first cell, a first absolute radio-frequency channel number (ARFCN), the first RX_BW and the first location of the first RX_BW.

Step 408: The first BS transmits a Handover Request Acknowledge message comprising the handover command, to the second BS, in response to the Handover Request message.

Step 410: End.

The second BS transmits the first handover command to the first UE. In one example, the second BS may receive a first plurality of UE capabilities of a first UE from the first UE, a third BS or a core network node, wherein the first plurality of UE capabilities indicate a first maximum reception bandwidth for a first frequency band.

Realization of the process 40 is not limited to the above description. The following examples may be applied to the process 40.

In one example, the first maximum RX_BW is greater than or equal to the first RX_BW. The first RX_BW is the maximum RX_BW configured by the first BS. The first BS transmits data or physical control signals to the first UE in the first RX_BW (i.e., a bandwidth where a DL transmission spans is smaller than or equal to the first transmission (TX) BW (TX_BW)). The first maximum RX_BW indicates the maximum RX_BW in which the UE is capable of performing receptions.

In one example, the first plurality of UE capabilities indicate (e.g., include) a first maximum TX_BW in which the first UE is capable of performing transmissions. The first BS obtains (e.g., determines) a first TX_BW and a second location of the first TX_BW according to the first maximum TX_BW. The first maximum TX_BW is greater than or equal to the first TX_BW. The first BS configures or schedules any transmissions from the first UE in the first TX_BW (i.e., a bandwidth where an UL transmission spans is smaller than or equal to the first TX_BW). In one example, the first handover command includes a second ARFCN, the first TX_BW and the second location of the first TX_BW. If the first handover command does not include the second ARFCN, the first UE derives the second ARFCN according to the first ARFCN in a frequency-division duplexing (FDD). For a time-division duplexing (TDD), the second ARFCN may not be included in the first handover command.

In one example, the first plurality of UE capabilities are UE-NR-Capability information elements (IE) or UE-EU-TRA-Capability IEs. The core network (CN) node is an Access and Mobility Management function (AMF) or a Mobility Management Entity (MME). In one example, the first ARFCN may indicate the first carrier belonging to the first frequency band. The second ARFCN may indicate a second carrier belonging to the first frequency band. In the TDD, the second ARFCN is the same as the first ARFCN, and both the ARFCNs indicate the first carrier. In the FDD, the second ARFCN is different from the first ARFCN, and both the ARFCNs indicate different carriers.

In one example, the second BS receives a second plurality of UE capabilities from a second UE, the third BS or the core network node, wherein the second plurality of UE capabilities indicate a second maximum RX_BW or a second maximum TX_BW for the first frequency band. The second maximum RX_BW indicates the maximum RX_BW in which the second UE is capable of performing a reception. The second maximum TX_BW is smaller than or equals to the second maximum RX_BW.

In one example, the second BS transmits a second Handover Request message to the first BS, to initiate a handover for the second UE, wherein the second Handover Request message includes the second plurality of UE capabilities.

In one example, the first BS obtains a second RX_BW and a third location of the second RX_BW in the first carrier according to the second maximum RX_BW. The first BS generates a second handover command configuring the second UE to hand over to the first cell, wherein the second handover command includes the first cell identity, the first ARFCN, the second RX_BW and the third location of the second RX_BW.

In one example, the first BS obtains a second TX_BW and a fourth location of the second TX_BW according to the second maximum TX_BW. The first BS generates a second handover command configuring the second UE to hand over to the first cell, wherein the second handover command includes the first cell identity, the first ARFCN, the second TX_BW and the fourth location of the second TX_BW.

In one example, the first BS transmits a second Handover Request Acknowledge message including the second handover command, to the second BS, in response to the second Handover Request message. The second BS transmits (or forwards) the second handover command to the second UE. In one example, the second handover command includes the second ARFCN, the second TX_BW and the fourth location of the second TX_BW within the second carrier. If the second handover command does not include the second ARFCN, the second UE derives the second ARFCN according to the first ARFCN in FDD. For TDD, the second ARFCN is not included in the second handover command.

In one example, the second maximum TX_BW and the first maximum TX_BW are the same or different. The second maximum RX_BW and the first maximum RX_BW are same or different. The first and second maximum RX BWs are smaller than a bandwidth of the first carrier. The first location and the second location are the same or different. The third location and the fourth location are the same or different. The first location and the second location of are partially overlapped or non-overlapped. The third location and the fourth location are partially overlapped or non-overlapped. The third location and the first location are partially overlapped or non-overlapped. The fourth location and the second location are partially overlapped or non-overlapped.

In one example, the first BS or the second BS obtains that the first UE or the second UE supports a default TX_BW for the first frequency band according to the first maximum TX_BW or the second maximum TX_BW or obtains a default RX_BW for the first frequency band according to the first maximum RX_BW or the second maximum RX_BW.

In one example, the first handover command includes a first location information configuring the first location or a second location information configuring the second location. The second handover command includes a third location information configuring the third location or a fourth location information configuring the fourth location. In one example, each of the location information may indicate a reference position for (locating or indicating) the location of the RX_BW or the TX_BW (e.g., a starting position, a center position or an end position of the RX_BW or the TX_BW). Thus, the first UE or the second UE obtains the location of the first RX_BW or the second RX_BW at the first carrier according to the reference position and the first RX_BW or the second RX_BW or obtains the first TX_BW or the second TX_BW at the second carrier according to the reference position and the first TX_BW or the second TX_BW.

For example, the first carrier includes a plurality of physical resource blocks (PRBs) (e.g., N PRBs numbered from 1 (with lowest frequency) to N (with highest frequency, e.g., N=200). The RX_BW or the TX_BW is represented in the number of the PRBs (e.g., L PRBs, L<N, e.g., L=25). The reference position is a PRB number (or called a PRB index) indicating a specific PRB (e.g., the x-th PRB, 0<x<N, e.g., PRB number=31, i.e., 31st PRB in the 200 PRBs) at the first carrier. Then, the first UE or the second UE obtains the location with the PRB number and the number of PRBs (e.g., the RX_BW is from the 31st PRB to the 55th PRB). A similar example for the location of the TX_BW can be easily derived the example above.

In one example, both of the RX_BW/TX_BW and the location information indicating location of the RX_BW/TX_BW are replaced by a starting position and an end position in the first carrier or the second carrier. That is, the starting position and the end position indicate the bandwidth and the location. For example, the starting position is a starting PRB number and the end position is an end PRB number. The stating PRB number indicates the 31st PRB of the RX_BW and the end PRB number indicates the last PRB of the RX_BW. For example, the starting PRB number is 5 and the end PRB number is 45 for the first RX_BW (i.e., 41 PRBs). That is, the location of the first RX_BW is from the 5th PRB to the 45th PRB.

In one example, the first plurality of UE capabilities or the second plurality of UE capabilities indicate at least one of the first frequency band, a second frequency band, a first subcarrier spacing capability for each frequency band, a beam forming capability for each frequency band and a multiple-input multiple-output (MIMO) capability for each frequency band. The first plurality of UE capabilities include a third maximum RX_BW or a third maximum TX_BW for the second frequency band.

In one example, before initiating the handover, the second BS transmits a first measurement configuration to a first UE, wherein the first measurement configuration configures the first ARFCN, a first allowed measurement bandwidth and a location of the first allowed measurement bandwidth. The second BS receives a first measurement report from the first UE, wherein the first measurement report includes at least one first measurement result measured by the first UE on at least one first reference signal (RS) in the first allowed measurement bandwidth at the location. The first allowed measurement bandwidth is the same as or different from the first RX_BW. The location of the first allowed measurement bandwidth is the same as or different from the location of the first RX_BW. The location of the first allowed measurement bandwidth and the location of the first RX_BW are partially or completely overlapped or non-overlapped.

In one example, the first measurement configuration includes first location information which configures the location of the first allowed measurement bandwidth. In one example, the first location information may indicate a reference position for indicating the location of the first allowed measurement bandwidth (e.g., a starting position, a center position or an end position of the first allowed measurement bandwidth). Thus, the first UE obtains the location of the first allowed measurement bandwidth at the first carrier according to the reference position and the first allowed measurement bandwidth. For example, the first carrier includes a plurality of PRBs (e.g., N PRBs numbered from 1 (with lowest frequency) to N (with highest frequency, e.g., N=200). The first allowed measurement bandwidth is represented in the first number of PRBs (e.g., L PRBs, L<N, e.g., L=25). The reference position may indicate a PRB number (or called a PRB index) indicating a specific PRB (e.g., the x-th PRB, 0<x<N, e.g., PRB number=1, i.e., 1st PRB in the 200 PRBs) at the first carrier. Then, the UE obtains the location with the PRB number and the first number of PRBs (e.g., the first allowed measurement bandwidth is from the 1st PRB to the 25th PRB).

In one example, both of the allowed measurement bandwidth and the location information indicating location of the allowed measurement bandwidth are replaced by a starting position and an end position in the first carrier. That is, the starting position and the end position indicate the allowed measurement bandwidth and its location. The starting position is a first PRB number and the end position may be a second PRB number. The first PRB number indicates the first PRB of the allowed measurement bandwidth and the second PRB number indicates the last PRB of the allowed measurement bandwidth. For example, the first PRB number is 51 and the second PRB number is 100 for the example of the second allowed bandwidth describe above. Then the location of the second allowed bandwidth is from the 51st PRB to the 100th PRB.

In one example, the at least one first RS includes a primary synchronization signal (PSS), a secondary synchronization signal (SSS), a PBCH and/or channel state information RS (CSI-RS). Each of the at least one first measurement result may be in a unit of reference signal received power (RSRP) or reference signal received quality (RSRQ). The RSRP or the RSRQ is calculated from a plurality of measurements on the at least one reference signal (e.g., PSS-RSRP, PSS-RSRQ, SSS-RSRP, SSS-RSRQ or SSB-RSRP). The SSB includes the PSS, the SSS and/or the PBCH.

In one example, the at least one first measurement result is associated to the first cell. The first measurement report includes the first cell identity of the first cell, which is associated to the first measurement result.

In one example, the at least one first measurement result is associated to at least one first SSB index (e.g., number or identity). The at least one first SSB index indicates the SSBs or the RSs in the SSBs measured by the first or second UE to obtain the at least one first measurement result. The first measurement report includes the at least one first SSB index.

In one example, a second measurement result in the at least one first measurement result is associated to a first CSI-RS configuration configuring at least one CSI-RS. The first measurement result or the second measurement result includes a first CSI-RS configuration identity of the first CSI-RS configuration, which is associated to the second measurement result.

In one example, the second BS determines to initiate the handover for the first UE or the second UE according to the at least one first measurement result.

In one example, the first UE connects to the second BS and has a first radio resource control (RRC) connection (including at least one signaling radio bearer (SRB)) with the second BS. The first UE receives the first handover command and the first measurement configuration on the first RRC connection from the second BS. The first UE transmits the first measurement report on the first RRC connection to the second BS. After the handover to the first BS, the first UE has the first RRC connection with the first BS and transmits the first handover complete message on the first RRC connection to the first BS. In one example, the second UE connects to the second BS and has a second RRC connection (including at least one signaling radio bearer (SRB)) with the second BS. The second UE receives the second handover command from the second BS. After the handover to the first BS, the second UE has the second RRC connection with the first BS and transmits the second handover complete message on the second RRC connection to the first BS.

In one example, the second BS obtains the location of the first allowed measurement bandwidth according to the first plurality of UE capacities.

In one example, if the first handover command or the second handover command does not include the first RX_BW or the second RX_BW, the first UE or the second UE uses a default maximum RX_BW to communicate with the first BS. If the first handover command or the second handover command does not include the location of the first RX_BW or the second RX_BW, the first UE or the second UE uses a default location as the location of the first RX_BW or the second RX_BW to communicate with the first BS.

In one example, if the first handover command or the second handover command includes the first TX_BW or the second TX_BW, the first BS obtains the first TX_BW and the second TX_BW and the location of the first TX_BW and the second TX_BW according to the first TX_BW and the second TX_BW. In one example, if the first handover command or the second handover command does not include the first TX_BW or the second TX_BW, the first UE or the second UE uses a default TX_BW as the first TX_BW or the second TX_BW to perform transmissions to the first BS. In one example, if the first handover command or the second handover command does not include the location of the first TX_BW or the second TX_BW, the first UE or the second UE uses a default location as the location of the first TX_BW or the second TX_BW to perform transmissions to the first BS.

In one example, the default RX_BW or the default TX_BW and the default location are specified by a 3GPP specification.

In one example, the second BS, instead of the first BS, generates the first handover command or the second handover command, when the first cell or the second cell belongs to the second BS. In this case, the operations performed by the first BS above are performed by the second BS. Accordingly, the second BS does not transmit the first Handover Request message or the second Handover Request message and does not receive the first Handover Request Acknowledge message or the second Handover Request Acknowledge message. The second BS transmits the first handover command or the second handover command to the first UE or the second UE.

In one example, the first UE or the second UE receives transmissions from the first BS in the location of the first RX_BW or the second RX_BW according to the first RX_BW or the second RX_BW. The first UE or the second UE transmits the handover complete message in the location of the first TX_BW or the second TX_BW in the first TX_BW or the second TX_BW.

In one example, the first handover command and the second handover command are RRC messages (e.g., RRC Reconfiguration messages). The first handover complete message and the second handover complete messages are RRC response messages (e.g., RRC Reconfiguration Complete messages).

In one example, the first measurement configuration and the first measurement report include a first measurement identity. The first Handover Request message include the at least one first measurement result and the associated identities as described above. In one example, the first BS obtains the location of the first RX_BW according to the at least one first measurement result. In one example, the second BS, instead of the first BS, obtains the location of the first RX_BW according to the at least one first measurement result and indicates the location of the first RX_BW to the first BS.

In one example, the first BS obtains the location of the first RX_BW according to a scheduling algorithm, a traffic offloading or dispersion algorithm or a quality-of-service (QoS) profile configured to the UE. In one example, the first BS obtains the location of the first RX_BW according to a combination of the parameters described above.

In one example, "transmissions" above include control signals and/or data. The control signals transmitted by the UE include sounding reference signals or hybrid automatic repeat request (HARQ) acknowledgement (ACK), HARQ negative acknowledgement (NACK), CSI on physical UL control channels (PUCCHs). The data include physical UL shared channel (PUSCH) transmissions. The control signals are transmitted by the first BS or the second BS on physical DL control channels (PDCCHs). The transmissions performed by the first BS or the second BS include physical DL shared channel (PDSCH) transmissions.

Figure 5:
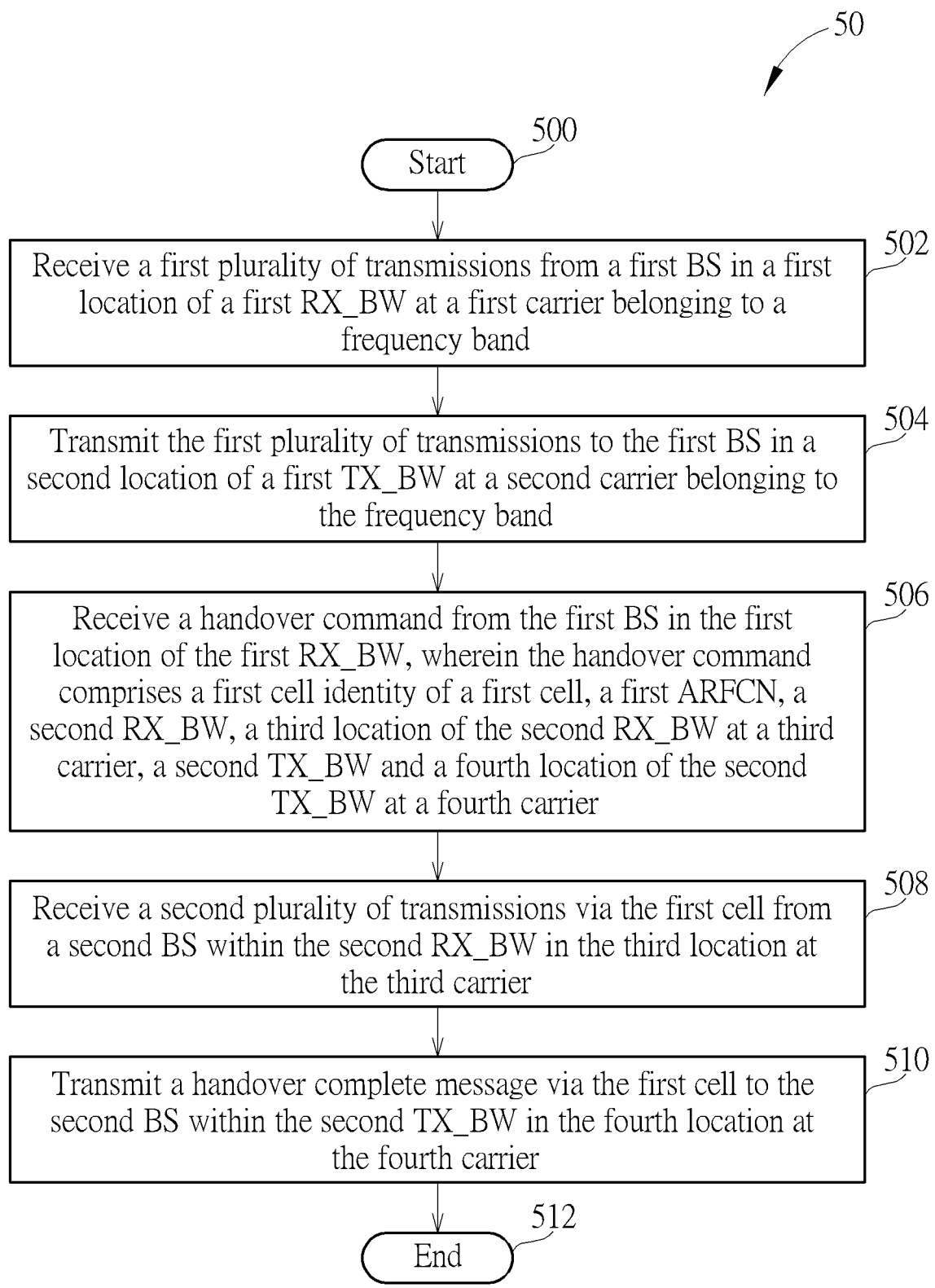
FIG. 5 is a flowchart of a process according to an example of the present invention.

A process 50 in FIG. 5 is utilized in a UE for handling a handover, and includes the following steps:

Step 500: Start.

Step 502: Receive a first plurality of transmissions from a first BS in a first location of a first RX_BW at a first carrier belonging to a frequency band.

Step 504: Transmit the first plurality of transmissions to the first BS in a second location of a first TX_BW at a second carrier belonging to the frequency band.

Step 506: Receive a handover command from the first BS in the first location of the first RX_BW, wherein the handover command comprises a first cell identity of a first cell, a first ARFCN, a second RX_BW, a third location of the second RX_BW at a third carrier, a second TX_BW and a fourth location of the second TX_BW at a fourth carrier.

Step 508: Receive a second plurality of transmissions via the first cell from a second BS within the second RX_BW in the third location at the third carrier.

Step 510: Transmit a handover complete message via the first cell to the second BS within the second TX_BW in the fourth location at the fourth carrier.

Step 512: End.

Realization of the process 50 is not limited to the above description. The following examples may be applied to the process 50.

In one example, the frequency band is the same as or different from the first frequency band described in the process 40. In one example, the handover command may comprise a second ARFCN. The first ARFCN may indicate the third carrier and the second ARFCN may indicate the fourth carrier.

In one example, the first TX_BW is smaller than or equal to the first RX_BW.

In one example, the UE transmits a plurality of UE capabilities to the first BS in the first TX_BW in the second location. The plurality of UE capabilities indicate (e.g., include) a maximum RX_BW for the frequency band. The plurality of UE capabilities may indicate (e.g., include) a maximum TX_BW for the frequency band.

In one example, the UE transmits the second plurality of transmissions via the first cell to the second BS in the fourth location of the second TX_BW at the fourth carrier.

In one example, the UE obtains (e.g., determines) the first RX_BW according to the maximum RX_BW (i.e., capability) for the frequency band or according to the frequency band. In one example, the UE searches the first location in the first carrier by detecting the PSS, the SSS or the PBCH.

In one example, the UE obtains (e.g., determines) the first TX_BW according to the maximum RX_BW or according to the frequency band. The first BS broadcasts information of the first TX_BW in the PBCH or a first system information block (SIB) in the first location. The UE receives information of the second location from the PBCH, the first SIB or the second SIB broadcast by the first BS.

In one example, the UE obtains (e.g., determines) a fifth location of the first carrier according to a third ARFCN. In one example, the UE obtains (e.g., determines) a sixth location of the second carrier according to a fourth ARFCN. The UE receives the fourth ARFCN from the PBCH or from the first SIB or a second SIB broadcasted by the first BS within the third location. In one example, the UE obtains (e.g., determines) the fourth ARFCN according to the third ARFCN, if the first BS does not broadcast it.

In one example, the UE receives at least one configuration indicating (e.g., including) the first RX_BW, the first location, the first TX_BW, the second location, the third ARFCN, or the fourth ARFCN from a BS (e.g. the first BS or other BS) in a RRC message (e.g., RRC Reconfiguration message).

Examples described for the process 40 can be applied to the process 50 and are not narrated herein. The following may be applied to the processes 40-50.

The carriers above may be same or different, and may belong to the same frequency band or different frequency bands. If the carriers are same, one of same carriers may be omitted in the handover command. The TX_BW is smaller than or equal to the RX_BW. "obtain" may be replaced by "determine" and "comprise" or "include" may be replaced by "indicate".

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides methods and devices for handling a handover. The second BS is informed the maximum. RX_BW of the UE by the first BS. The UE can receive the RX_BW successfully. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first base station (B S) for handling a handover, comprising:
    at least one storage device; and
    at least one processing circuit, coupled to the at least one storage device, wherein the at least one storage device stores, and the at least one processing circuit is configured to execute instructions of:
    the first BS receiving a Handover Request message from a second BS, to initiate a handover for the first communication device, wherein the Handover Request message comprises a first plurality of UE capabilities, and the first plurality of UE capabilities indicate a first maximum reception (RX) bandwidth (BW) (RX_BW) for a frequency band;
    the first BS obtaining a first RX_BW and a first location of the first RX_BW at a first carrier according to the first maximum RX_BW;
    the first BS generating a handover command configuring the first communication device to hand over to a first cell, wherein the handover command comprises a first cell identity of the first cell, a first absolute radio-frequency channel number (ARFCN), the first RX_BW and the first location of the first RX_BW; and
    the first BS transmitting a Handover Request Acknowledge message comprising the handover command, to the second BS, in response to the first Handover Request message.

2. The first BS of claim 1, wherein the first maximum RX_BW is greater than or equals to the first RX_BW.

3. The first BS of claim 1, wherein the first plurality of UE capabilities indicate a first maximum transmission (TX) BW (TX_BW) in which the first communication device is capable of performing a transmission.

4. The first BS of claim 3, wherein the instructions further comprise:
    the first BS obtaining a first TX_BW and a second location of the first TX_BW according to the first maximum TX_BW.

5. The first BS of claim 3, wherein the handover command comprises a second ARFCN, the first TX_BW and the second location of the first TX_BW.

6. The first BS of claim 1, wherein the second BS obtains that the first communication device supports a default TX_BW or a default RX_BW for the frequency band.

7. A communication device for handling a handover, comprising:
- at least one storage device; and
- at least one processing circuit, coupled to the at least one storage device, wherein the at least one storage device stores, and the at least one processing circuit is configured to execute instructions of:
- receiving a first plurality of transmissions from a first BS in a first location of a first reception (RX) bandwidth (BW) (RX_BW) at a first carrier belonging to a frequency band;
- transmitting the first plurality of transmissions to the first BS in a second location of a first transmission (TX) BW (TX_BW) at a second carrier belonging to the frequency band;
- receiving a handover command from the first BS in the first location of the first RX_BW, wherein the handover command comprises a first cell identity of a first cell, a first absolute radio-frequency channel number (ARFCN), a second RX_BW, a third location of the second RX_BW at a third carrier, a second TX_BW and a fourth location of the second TX_BW at a fourth carrier;
- receiving a second plurality of transmissions via the first cell from a second BS within the second RX_BW in the third location at the third carrier; and
- transmitting a handover complete message via the first cell to the second BS within the second TX_BW in the fourth location at the fourth carrier.

8. The communication device of claim 7, wherein the first TX_BW is smaller than or equals to the first RX_BW.

9. The communication device of claim 7, wherein the instructions further comprise:
- transmitting the second plurality of transmissions via the first cell to the second BS in the fourth location of the second TX_BW at the fourth carrier.

10. The communication device of claim 7, wherein the instructions further comprise:
- transmitting a plurality of user-equipment (UE) capabilities of the communication device to the first BS in the second location of the first TX_BW, wherein the plurality of UE capabilities indicate a maximum RX_BW or a maximum TX_BW for the frequency band.

11. A first base station (BS) for handling a handover, comprising:
- at least one storage device; and
- at least one processing circuit, coupled to the at least one storage device, wherein the at least one storage device stores, and the at least one processing circuit is configured to execute instructions of:
- transmitting a plurality of transmissions to a communication device in a first location of a first reception (RX) bandwidth (BW) at a first carrier belonging to a frequency band;
- receiving the plurality of transmissions from the communication device in a second location of a first transmission (TX) BW (TX_BW) at a second carrier belonging to the frequency band;
- transmitting a Handover Request message to a second BS, to initiate a handover for the communication device;
- receiving a Handover Request Acknowledge message comprising a handover command, from the second BS, wherein the handover command comprises a cell identity of a cell, a first absolute radio-frequency channel number (ARFCN), a second RX_BW, a third location of the second RX_BW at a third carrier, a second TX_BW and a fourth location of the second TX_BW at a fourth carrier; and
- transmitting the handover command to the communication device in the first location of the first RX_BW, wherein the handover command comprises a cell identity of a cell, a first absolute radio-frequency channel number (ARFCN), a second RX_BW, a third location of the second RX_BW at a third carrier, a second TX_BW and a fourth location of the second TX_BW at a fourth carrier.

12. The BS of claim 11, wherein the first TX_BW is smaller than or equals to the first RX_BW.

13. The BS of claim 11, wherein the handover command comprises a second ARFCN.

* * * * *